United States Patent
Favreau

(12) 
(10) Patent No.: US 8,640,297 B2
(45) Date of Patent: Feb. 4, 2014

(54) THATCH REMOVING DEVICE AND METHODS THEREFORE

(76) Inventor: David A. Favreau, Lawrence, KS (US)

(*) Notice: Subject to any disclaimer, the term of this patent is extended or adjusted under 35 U.S.C. 154(b) by 330 days.

(21) Appl. No.: 12/454,430

(22) Filed: May 18, 2009

(65) Prior Publication Data

US 2010/0288303 A1  Nov. 18, 2010

(51) Int. Cl.
  *A47L 13/02* (2006.01)
(52) U.S. Cl.
  USPC ........................... 15/236.01; 172/371
(58) Field of Classification Search
  USPC ............. 15/236.01, 236.02, 236.04, 237; 172/371, 375, 380; D32/49
  See application file for complete search history.

(56) References Cited

U.S. PATENT DOCUMENTS

| | | | | | |
|---|---|---|---|---|---|
| 1,468,628 | A | * | 9/1923 | Dunbar | 172/371 |
| 1,669,711 | A | * | 5/1928 | Kanter | 30/333 |
| 1,699,933 | A | * | 1/1929 | Urban | 172/371 |
| 1,898,690 | A | * | 2/1933 | Schacht | 15/245 |
| 2,359,408 | A | * | 10/1944 | Disse | 30/169 |
| 4,779,301 | A | * | 10/1988 | Millette | 15/105 |
| 4,890,679 | A | * | 1/1990 | Jacobs | 172/371 |
| 6,412,569 | B1 | * | 7/2002 | Webb | 172/371 |
| 6,780,252 | B1 | * | 8/2004 | Holst | 134/6 |
| 2006/0096765 | A1 | * | 5/2006 | Trozelle | 172/371 |

* cited by examiner

*Primary Examiner* — Saeed T Chaudhry
(74) *Attorney, Agent, or Firm* — John C. McMahon

(57) ABSTRACT

Devices for removing thatch buildup from the underside of a mower deck, and methods therefore. The device includes a head having a straight edge and at least one curved edge, a neck, and a conical handle.

2 Claims, 2 Drawing Sheets

THATCH REMOVING DEVICE AND METHODS THEREFORE

BACKGROUND OF THE INVENTION

Rotary mowers, such as push or riding lawnmowers, have high-speed rotating blades that are generally covered by a metal deck that prevents the mower from throwing objects (e.g., grass clippings, sticks, stones, and other objects that the mower encounters in the lawn) and at least tries to prevent contact between a person and the moving blades. One problem with the use of a deck is that some lawn clippings, referred to herein as "thatch," accumulates on the underside of the deck. In some circumstances, the amount of built-up thatch is so great that movement of the rotating blades is disrupted or even stopped. Removal of the thatch can be difficult due to the wet, sticky nature of the material, especially in curved portions of an underside of the deck.

SUMMARY OF THE INVENTION

In a first embodiment, a dethatching device for removing thatch buildup from the underside of a mower deck is provided, including a head; a neck having a first end and a second end, wherein the first end is attached to the head; and a handle having the shape of a truncated cone with a wide end opposite a narrow end, the handle being positioned such that the narrow end is closest to the head and attached to the second end of the neck, and being configured and arranged to fit in a hand of a user.

In a further embodiment of the first embodiment, the head includes a semi-triangular blade having an attachment portion attached to the neck, a straight edge, and a curved edge sized and shaped to substantially cooperate with a curved portion of the underside of a lawn mower deck. In a still further embodiment, the straight edge is generally perpendicular to the neck.

In another further embodiment of the first embodiment, the neck includes a straight portion having a longitudinal axis and associated with the second end of the neck, and a curved portion associated with the first end and attached to the head, such that the head is disposed at an acute angle with respect to the longitudinal axis of the straight portion of the neck. In a still further embodiment, the acute angle is from about 10-degrees to about 50-degrees with respect to the longitudinal axis. In a still further embodiment, the acute angle is from about 15-degrees to about 40-degrees with respect to the longitudinal axis.

In a second embodiment, a dethatching device for removing thatch buildup from the underside of a mower deck is provided, the dethatching device including a head having a straight edge and two curved edges, wherein the curved edges are sized and shaped to cooperate with a curved portion of the underside of a mower deck; a neck having a curved portion attached to the head and a straight portion having a longitudinal axis, wherein the curved portion is shaped such that the head is disposed at an acute angle with respect to the longitudinal axis of the straight portion of the neck; and a handle having the shape of a truncated cone with a wide end opposite a narrow end, the narrow end being connected to the straight portion of the neck, and being configured and arranged to fit in a hand of a user.

In a further embodiment of the second embodiment, the acute angle is from about 10-degrees to about 50-degrees with respect to the longitudinal axis.

In a third embodiment, a method of removing thatch build-up from the underside of a mower deck is provided, the method including the steps of providing a dethatching device comprising a head having a straight edge and two curved edges, wherein the curved edges are sized and shaped to cooperate with a curved portion of the underside of a mower deck; a neck having a curved portion attached to the head and a straight portion having a longitudinal axis, wherein the curved portion is shaped such that the head is disposed at an acute angle with respect to the longitudinal axis of the straight portion of the neck; and a handle having the shape of a truncated cone with a wide end opposite a narrow end, the narrow end being connected to the straight portion of the neck, and being configured and arranged to fit in a hand of a user; grasping the handle; holding a curved edge of the head against the curved portion of the underside of a mower deck; and pulling the head backward such that an amount of thatch on the underside of the mower deck is removed therefrom.

In a further embodiment of the third embodiment, the method includes the step of holding the straight edge of the head against a straight portion of the underside of a mower deck.

OBJECTS AND ADVANTAGES OF THE INVENTION

One object of this invention is to provide a hand-held device for removing thatch from the underside of a rotary mower deck, especially in one embodiment the device has a blade that is sized and shaped to fit into the curved portions of the deck, such as where the top of the deck joins the deck side wall (e.g., curtain). Another object of this invention that is found in certain embodiments is to provide a thatch-removing device that easily cuts into such thatch accumulation on the underside of the deck, such that an amount of the thatch can be lifted and/or pulled away from the underside of the deck. It is yet another object of this invention to provide an embodiment wherein a hand-held device for removing thatch from the underside of a mower deck, wherein the device does not substantially slip out of a hand of a user, even in wet conditions. It is still another object of this invention associated with certain embodiments to provide a method of removing thatch build-up from the underside of a mower deck, including in curved areas of the mower deck underside.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
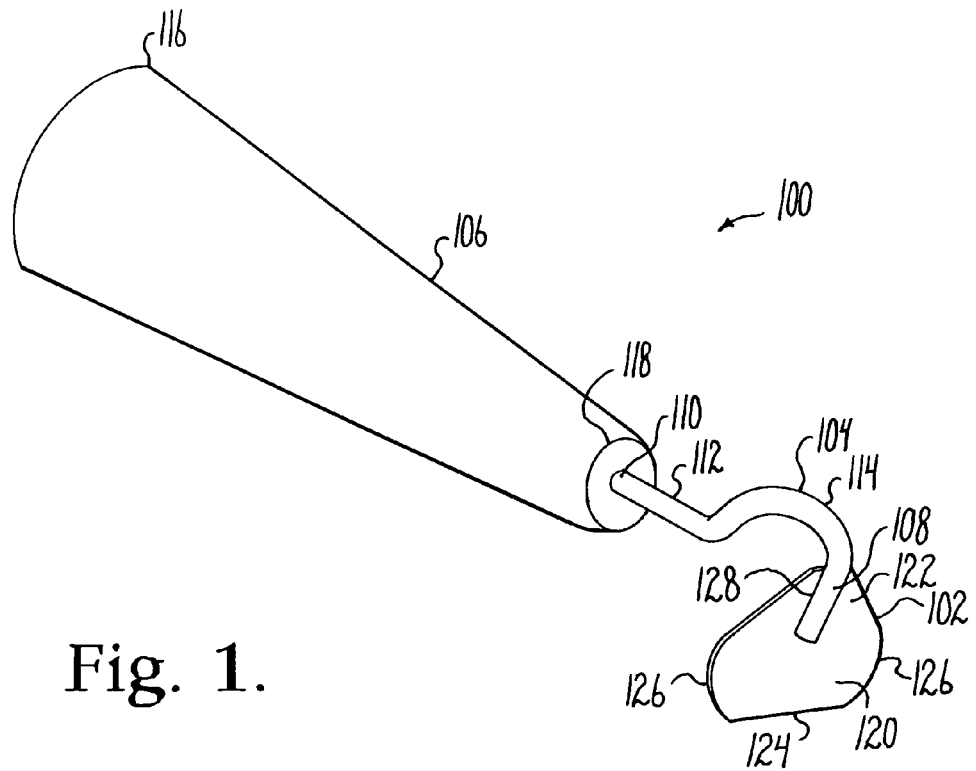
FIG. 1 is a perspective view of a dethatching device.
Figure 2:
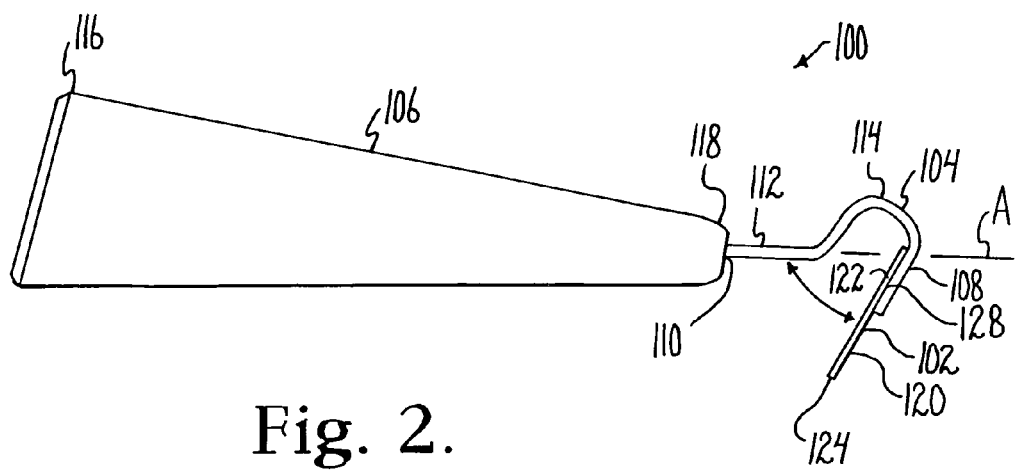
FIG. 2 is a side view of the dethatching device of FIG. 1.

Referring to FIGS. 1 and 2, a dethatching device for removing thatch buildup from the underside of a deck of a mower, such as but not limited to home and commercial lawnmowers, is generally denoted by the numeral 100. The dethatching device 100 includes a head 102, a neck 104, and a handle 106. The device 100 is generally configured and arranged to be grasped by a hand of a user such that the user can generally cut-into and break or chip away thatch buildup (e.g., accumulation) on the underside of a mower deck. Advantageously, the head 102 is sized, shaped and arranged to fit into curved portions or areas of the underside of a mower deck (see discussion below), which are generally difficult to clean with devices that are commonly used for this purpose, such as but not limited to chisels or screw-drivers. In contrast with such commonly used devices, the handle 106 of the dethatching device 100 is size and shaped to prevent the device 100 from slipping out of the user's hand, even in wet conditions.

The neck 104 includes a first end 108 that is attached to the head 102, and a second end 110 that is attached to the handle 106. The neck 104 includes a straight portion 112 that is coaxial with axis A (e.g., associated with axis A, see FIG. 2) and associated with the second end 110 of the neck 104. The neck 104 also includes a curved portion 114 that is associated with the first end 108 and attached to the head 102, such that the head 102 is disposed at an acute angle (e.g., angle B) with respect to the longitudinal axis A of the straight portion 112 of the neck 104 (see discussion below).

The handle 106 is a truncated cone with a wide end 116 opposite a narrow end 118, and can be formed of wood, plastic or combinations thereof, and can include a non-slip gripping surface. The handle 106 is positioned such that the narrow end 118 is closest to the head 102 and attached to the second end 110 of the neck 104. The handle 106 is configured and arranged to fit in a hand 119 of a user (e.g., see FIG. 4). When the handle 106 is gripped by the user, the conical shape, with the wider end 116 being nearest the back edge of the user's palm, prevents the handle 106 from slipping through the user's hand 119, even in wet conditions, such as by providing a resisting structure against which the user's hand 119 applies force when the device 100 is pressed into thatch 140 and pulled in a generally backwards scrapping or chopping motion.

The head 102 is a semi-triangular blade 120 having an attachment portion 122, a straight edge 124, and at least one curved edge 126. The term "semi-triangular" as used herein is a broad term, and is to be given its ordinary and customary meaning to a person of ordinary skill in the art (that is, it is not to be limited to a special or customized meaning), and refers without limitation to being generally triangular in shape except that one or more corners has been rounded off into a curve, especially having a radius of curvature. It is foreseen that the radius of curvature can be for a particular mower where the thatch remover is sold with a specific mower or alternatively designed to be an average of such curvature for mowers in general or also alternatively sized to be effective in scrapping into the curvature of most mowers in general. As shown in FIG. 1, the straight edge 124 is generally opposite from the attachment portion 122 and therefore farthest away from the neck 104, and at least one curved edge 126 is adjacent to and optionally continuous with the straight edge 124.

The head 102 is formed from a generally flat piece of metal. It is foreseen that the head 102 can be cut from a sheet of metal, such as but not limited to a sheet of steel or iron about one-eighth-inches thick, or the head 102 can be molded from molten metal (e.g., an alloy such as steel), using methods known in the art. The attachment portion 122 of the head 102 is connected to the neck 104, which is also formed of metal, via the first end 108 of the neck 104. The connection 128 between the attachment portion 122 and the first end 108 can be made using any attachment methods or structures known in the art, such as but not limited to welding, rivets, nuts and bolts, and the like. The connection 128 should be a substantially firm connection that can withstand repeated application of force thereto, such as can be applied by using the device to scrape or chop the thatch 140 build-up. The head 102 is attached to the neck 104 such that the straight edge 124 is generally perpendicular to the neck 104, especially with respect to axis A (e.g., straight portion 112). After the head 102 and neck 104 have been connected (e.g., attached, joined), they can be painted, such as with oil-based paint, to prevent rust.

Figure 3:
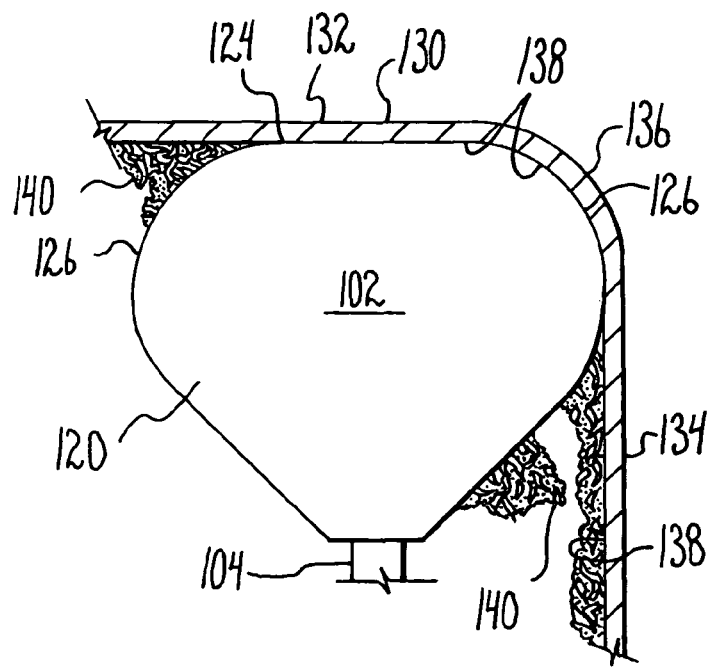
FIG. 3 is a fragmentary view of the deck of a rotary lawn mower and the dethatching device of FIG. 1.
Figure 4:
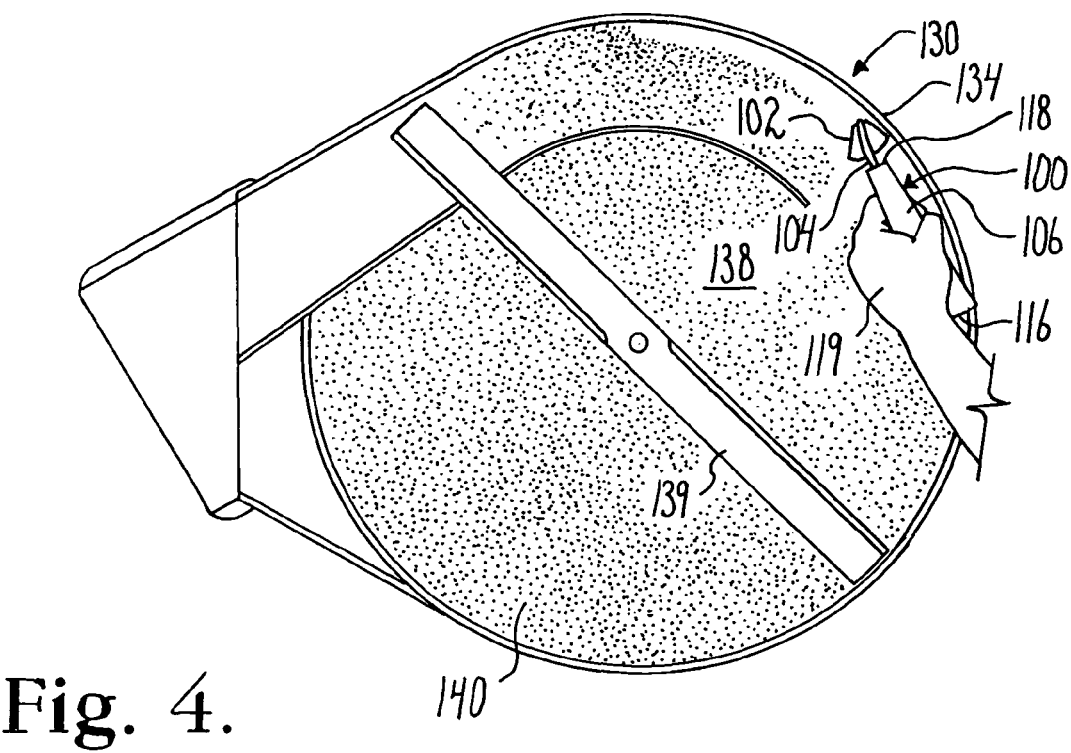
FIG. 4 is a bottom plan view of the mower showing the use of the dethatching device of FIG. 1 to remove thatch buildup from the underside of the mower deck.

FIG. 3 shows a cross-section of mower deck 130 in contact with the head 102 of the dethatching device or thatch remover 100 of the illustrated embodiment. FIG. 4 illustrates the use of the thatch remover 100 to remove thatch 140 buildup from the underside of a mower deck 130. Referring to FIG. 3, the mower deck 130 includes a top 132, a skirt 134, and a curved shoulder 136 having a radius of curvature. Additionally, the deck 130 includes an underside 138 upon which thatch 140 can build up (e.g., accumulate). The deck 130 is configured and arranged to protect the mower's rotary cutting blade 139 and, therefore, the deck skirt 134 functions as a cowling to cover the blade 139 from the side of the mower and especially to block the flight of grass clippings and hard objects thrown up and outward by the blades 139 as they rotate at high speed. The thatch 140 is typically formed of grass clippings that become attached to the underside 138 of the deck 130, especially in the underside 138 of the shoulder 136, and are generally thick and wet. After time the thatch 140 can dry and harden. If not removed, over time, the thatch 140 can increase in volume such that it prevents rotation of the mower's rotary blade 139. Additionally, unremoved thatch 140 when dry can obstruct the blade 139 and/or become a hazardous projectile, if chunks of it fall off during mower operation and still further can cause permanent damage to the deck 130 since the thatch 140 holds moisture and chemicals against the deck 130.

Still referring to FIGS. 3 and 4, the curved edge 126 of the head 102 is sized and shaped to generally cooperate with a shoulder 136 (e.g., the curved portion) of the underside 138 of a mower deck 130. For example, the curved edge 126 of the thatch remover 100 is shaped to fit closely to the curve (e.g., cooperate with) of the underside 138 of the shoulder 136. Thus, the thatch 140 buildup can be cleanly removed from this area of the deck underside 138 by pulling the remover 100 toward the user so as to engage the deck 130 with the remover 100 blade 120 to scraps away the thatch 140. In some circumstances, the shoulders 136 of different mower decks 130 may have different curves that are not identical to the curve of the curved edge 126. In these circumstances, the dethatching device 100 can be rotated about axis A, such that the curved edge 126 more closely fits and therefore cooperates with the underside 138 of the shoulder 136. Thus, thatch 140 attached to the underside 138 of the shoulder 136 can be easily and cleanly removed therefrom by pulling the thatch removing device 100 in a generally backwards direction (e.g., with respect to the user) or toward the user. For example, the user can grasp the device 100 by the handle 106, hold the curved edge 126 against the curved portion of the underside 138 of the mower deck 130 (e.g., of the shoulder 136), and pull the head 102 backward such that an amount of thatch 140 on the underside 138 of the mower deck 130 is removed therefrom.

Referring now to FIG. 2, the head 102 is attached to the first end 108 of the neck 104, such that the plane of the head 102 is disposed at an acute angle B, with respect to axis A. For example, the curved portion 114 of the neck 104 includes a hook-like configuration, wherein the curved portion 114 bends radially away from the axis A of the straight portion 112, and then bends back on itself such that when the head 102 is attached to the curved portion 114 (e.g., at the first end 108), the head 102 is disposed at an acute angle B with respect to the axis A of the straight portion 112. In some embodiments, the acute angle B is from about 10-degrees to about 50-degrees. In other embodiments, the acute angle B is from about 15-degrees to about 40-degrees. In other embodiments, the acute angle B is about 5, 10, 15, 20, 25, 30, 35, 40, 45, or 50-degrees. The angle B of the head 102, such as with respect to the neck straight portion 112 and to the handle 106 is selected to enable the head 102 to more easily penetrate the thatch 140, such that the thatch 140 can be easily removed from the underside 138 of the mower deck 130. Accordingly, the user can hold the straight edge 124 of the head against a straight (e.g., flat) portion of the underside 128 of a mower deck 130, and pull the head 102 backward such that an amount of thatch 140 on the underside 138 of the mower deck 130 is removed therefrom.

It is to be understood that while certain forms of the present invention have been illustrated and described herein, it is not to be limited to the specific forms or arrangement of parts described and shown.

What is claimed and desired to be secured by Letters Patent is as follows:

1. A dethatching device for removing thatch buildup from the underside of a mower deck, the dethatching device comprising:
    a) a handle having the shape of a truncated cone extending the length of the handle along a first axis with a wide end surface opposite a narrow end surface, the wide end surface being sloped, and the handle being configured and arranged to fit in a hand of a user such that during use a user's hand is adapted to grip the truncated cone while the user is pulling the device, the width of the handle resisting slipping;
    b) a head being substantially obtuse to the first axis and an attachment portion, the head having:
        i) a lower straight edge having first and second ends being adapted for scraping; an upper straight edge having first end and second end and having a length smaller than the lower straight edge;
        ii) first and second angled edges, each having an upper portion and a lower portion, the lower straight edge first end and the upper straight edge first end being connected by the first angled edge, and the lower straight edge second end being connected by the second angled edge;
        iii) each of the first and second angled edges upper portions being straight and inwardly traverse to the lower straight edge, each of the first and second angled edges lower portions being curved toward the lower straight edge and traverse to the upper portion, the upper and lower portions of the angled edges and lower straight edge being adapted for scraping, each angled edge and lower straight edge being sized and shaped to substantially mate with and operatively scrape a curved portion of the underside of a lawn mower deck; the lower straight edge, the pair of angled edges, and the pair of curved edges cooperating to provide for scraping;
    c) a neck having a first end and a second end, the neck joining the handle to the head, the handle being positioned such that the narrow end is closest to the head and attaches to the second end of the neck and the first end attached to the attachment portion of the head, the neck including;
        i) a straight portion along the first axis and associated with the second end of the neck, and a curved portion associated with the first end, such that the head is disposed at an acute angle with respect to the first axis, such that the lower straight edge is angled towards the handle.

2. A dethatching device for removing thatch buildup from the underside of a mower deck, the dethatching device comprising:
    a) a handle having the shape of a truncated cone extending the length of the handle along a first axis with a wide end surface opposite a narrow end surface, the wide end surface being sloped, and the handle being configured and arranged to fit in a hand of a user such that during use a user's hand is adapted to grip the truncated cone while the user is pulling the device, the width of the handle resisting slipping;
    b) a head being substantially obtuse to the first axis and an attachment portion, the head having:
        i) a lower straight edge having first and second ends being adapted for scraping;
        ii) an upper straight edge having first and second ends, the upper straight edge being parallel to the lower straight edge and having a length smaller than the lower straight edge and the lower straight edge being closer to the handle than the upper straight edge with respect to the first axis;
        iii) first and second angled edges, each having an upper portion and a lower portion, the lower straight edge first end and the upper straight edge first end being connected by the first angled edge, and the lower straight edge second end and the upper straight edge second end being connected by the second angled edge;
        iv) each of the first and second angled edges upper portions being straight and traverse to the upper straight edge, each of the first and second angled edges lower portions being curved toward the lower straight edge and traverse to the upper portion, the upper and lower portions of the angled edges and lower straight edge being adapted for scraping, each angled edge and lower straight edge being sized and shaped to substantially mate with and operatively scrape a curved portion of the underside of a lawn mower deck; the lower straight edge, the pair of angled edges, and the pair of curved edges cooperating to provide for scraping;
    c) a neck having a first end and a second end, the neck joining the handle to the head, the handle being positioned such that the narrow end is closest to the head and attaches to the second end of the neck and the first end attached to the attachment portion of the head, the neck including;
        i) a straight portion along the first axis and associated with the second end of the neck, and a curved portion associated with the first end, such that the head is disposed at an acute angle with respect to the first axis, such that the lower straight edge is angled towards the handle.

* * * * *